United States Patent [19]
Jones et al.

[11] Patent Number: 5,805,191
[45] Date of Patent: Sep. 8, 1998

[54] INTERMEDIATE TRANSFER SURFACE APPLICATION SYSTEM

[75] Inventors: Brent R. Jones, Tualatin; Brently L. Cooper, Sherwood; Randy C. Karambelas, Milwaukie; Larry E. Hindman, Woodburn; Gerard H. Rousseau, Portland; Clark W. Crawford, Wilsonville; James D. Rise, Lake Oswego, all of Oreg.

[73] Assignee: Tektronix, Inc., Wilsonville, Oreg.

[21] Appl. No.: 97,332

[22] Filed: Jul. 23, 1993

Related U.S. Application Data

[63] Continuation-in-part of Ser. No. 981,646, Nov. 25, 1992, Pat. No. 5,389,958.

[51] Int. Cl.⁶ .................................. B41J 2/01; B41J 2/17; B41J 2/165
[52] U.S. Cl. .................................. 347/103; 347/84; 347/36
[58] Field of Search ................................ 347/104, 36, 20, 347/3, 33; 248/225.31, 316.6; 15/401; 118/659

[56] References Cited

U.S. PATENT DOCUMENTS

| | | | |
|---|---|---|---|
| 2,340,562 | 2/1944 | Rey | 369/13 |
| 3,210,792 | 10/1965 | Sassano | 15/401 |
| 4,158,498 | 6/1979 | Ohmori | 399/346 |
| 4,538,156 | 8/1985 | Durkee et al. | 346/21 |
| 4,673,303 | 6/1987 | Sansone et al. | 347/103 |
| 5,099,256 | 3/1992 | Anderson | 347/103 |
| 5,223,860 | 6/1993 | Loofbourow | 347/88 |

FOREIGN PATENT DOCUMENTS

| | | | |
|---|---|---|---|
| 401146750 | 6/1989 | Japan . | |
| 404251747 | 9/1992 | Japan | B41J 2/015 |
| 4042747 | 12/1995 | Japan . | |
| 7512307 | 12/1976 | Netherlands | 355/211 |
| 2242867 | 10/1991 | United Kingdom | 347/36 |

Primary Examiner—N. Le
Assistant Examiner—Raquel Yvette Gordon
Attorney, Agent, or Firm—Ralph D'Alessandro; William K. Bucher

[57] ABSTRACT

An apparatus and method are described for applying an intermediate transfer surface, in the form of a liquid layer, on a support surface as may be used in a phase change ink printing system. The apparatus includes an applicator assembly for distributing the liquid layer onto the support surface to produce the intermediate transfer surface and an apparatus for metering the liquid layer uniformly on the support surface. The applicator assembly has a contact medium for removing foreign matter from and delivering the liquid onto the support surface. Preferably the contact medium is a liquid impregnated web that is periodically incremented to present a clean web surface in contact with the support surface. The metering apparatus is a hydrodynamic blade that uniformly distributes the liquid intermediate transfer layer over the support surface. The apparatus provides for sequencing of the applicator, then the applicator and the blade together, and finally the blade only to ensure proper application of the intermediate transfer layer and cleaning of the support surface.

25 Claims, 5 Drawing Sheets

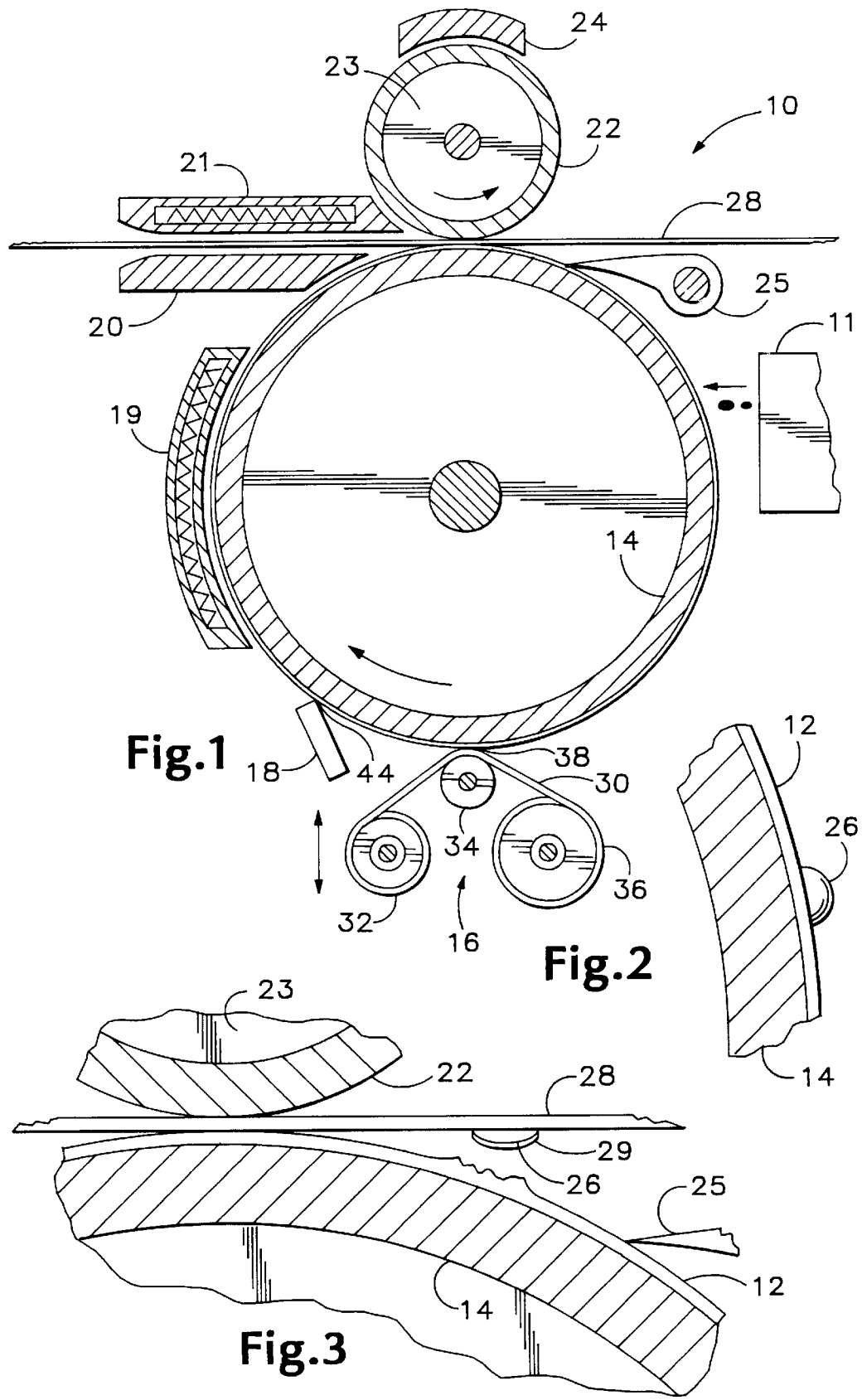

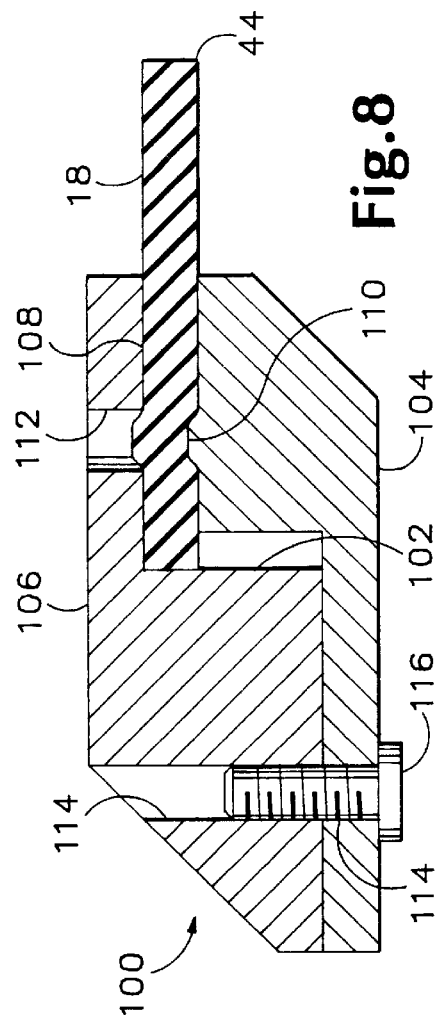
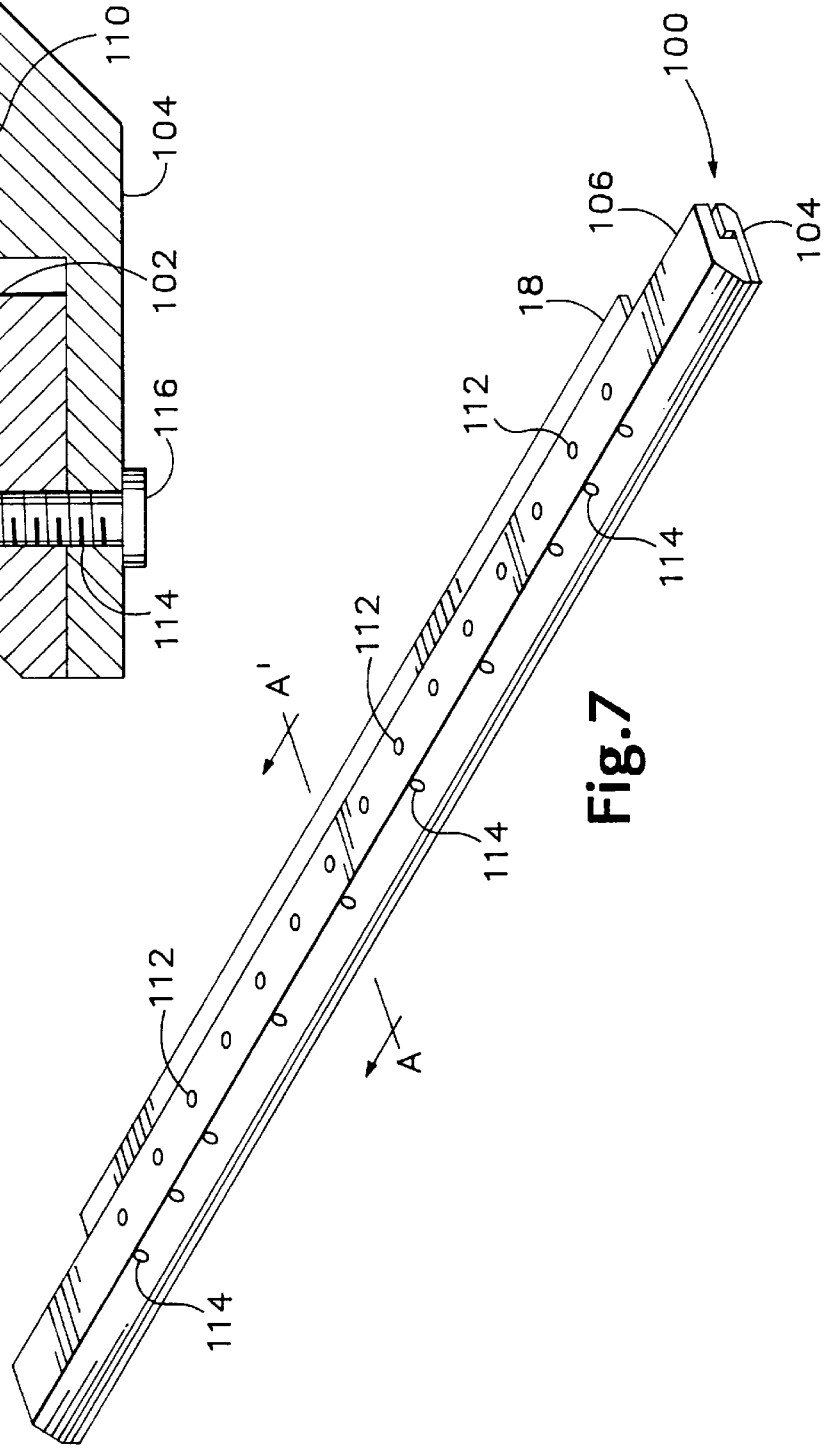

INTERMEDIATE TRANSFER SURFACE APPLICATION SYSTEM

This application is a continuation-in-part of U.S. patent application Ser. No. 07/981,646, filed Nov. 25, 1992, entitled "Imaging Process." U.S. Pat. No. 5,389,958 issued Feb. 14, 1995.

FIELD OF INVENTION

The present invention relates generally to an imaging process. More specifically, this invention relates to an application system and method for applying an intermediate transfer surface to a support surface as may be used in ink jet printing systems or the like.

BACKGROUND OF THE INVENTION

Ink jet printing systems have utilized intermediate transfer surfaces, such as that disclosed in U.S. Pat. No. 4,538,156 to Durkee et al. This patent discloses a system wherein an intermediate transfer drum is employed with a printhead. The surface of the transfer drum may be of a plastic material, such as teflon, tefzel, mylar or the like. In addition, smooth metal or ceramic surfaces can be used. A final receiving surface of paper is brought into contact with the intermediate transfer drum after the image has been placed thereon by the nozzles in the printhead. The image is then transferred to the final receiving surface. A cleaning medium is brought into contact with the intermediate transfer drum to prepare the surface of the drum prior to the next image being formed on the transfer surface.

U.S. Pat. No. 4,158,498 to Ohmori teaches a blade cleaning system for a reproducing apparatus wherein a doctor blade is in contact with an image transfer drum to remove residual toner from the drum during the photocopying process. When the copying process terminates, the doctor blade is rotated to a cleaning station where brushes remove any residual toner and foreign matter from the blade and applies a lubricant to the blade.

U.S. Pat. No. 5,099,256 to Anderson describes an intermediate drum with a surface which receives ink droplets from a printhead. The intermediate drum surface is thermally conductive and formed from a suitable film-forming silicone polymer allegedly having a high surface energy and high degree of surface roughness to prevent movement of the ink droplets after receipt from the printhead nozzles. Anderson teaches that the film-forming silicone polymer coating on the surface of the intermediate drum, enables substantially complete transfer of the dehydrated ink droplets therefrom to a recording medium, so that the removal of residual ink from the drum surface by the cleaning means, such as a blade is unnecessary. The teaching of Anderson, however, does not show how the film-forming silicone polymer is applied to the intermediate drum surface.

U.S. Pat. No. 4,673,303 to Sansone et al. discloses an offset ink jet postage printing method and apparatus in which an inking roll applies ink to the first region of a dye plate. A lubricating hydrophilic oil can be applied to the exterior surface of the printing drum or roll to facilitate the accurate transfer of the images from the drum or roll to the receiving surface.

Imaging systems using a liquid intermediate transfer surface require some sort of applicator assembly for metering the fluid onto the drum surface. One such applicator assembly has a felt wicking pad impregnated with the release fluid for applying the intermediate transfer surface to the drum. The use of such an applicator assembly suffers from a number of drawbacks. One major problem is that the felt pad becomes contaminated with foreign matter, such as untransferred ink, paper dust, and the like. Additionally, the amount of fluid delivered by the pad can change with time.

Lack of control over the intermediate transfer surface distribution and thickness has negative effects on printed image quality. Non-uniform film distribution or improper film thickness around the drum results in undesirable image artifacts. Those areas of the surface that have more fluid, show up on the image as shiny spots or streaks. If the intermediate transfer surface becomes too thin or is absent, ink can adhere to the drum and not be transferred. This problem becomes even more critical when final receiving surface for the image is an overhead transparency. Projection of the printed image magnifies areas of non-uniform fluid distribution.

What is needed is an intermediate transfer surface application system that overcomes the drawbacks of previous application systems. Such a system must provide a clean intermediate transfer surface free of residual material. Further such a system must deliver a uniform and consistent intermediate transfer surface.

SUMMARY OF THE INVENTION

Accordingly, the present invention is an apparatus and method for applying an intermediate transfer layer, in the form of a liquid layer, onto a support surface, such as a transfer drum or the like. The apparatus includes an applicator assembly for distributing the liquid layer onto the support surface to produce the intermediate transfer surface and a means for metering the liquid layer uniformly on the support surface. The applicator assembly has a contact medium for removing foreign matter from and delivering the liquid onto the support surface. Preferably the contact medium is a liquid impregnated web that is periodically incremented to present a clean web surface in contact with the support surface. The metering means is preferably a hydrodynamic wiper blade that uniformly distributes the liquid intermediate transfer layer over the support surface.

The method of applying an intermediate transfer surface onto a support surface includes the steps of concurrently removing foreign matter from and distributing a liquid layer onto the support surface using a liquid impregnated contact medium in contact with the support surface and metering the liquid layer uniformly on the support surface. The contact medium is disposed on an applicator assembly and a blade is used for uniformly metering the liquid layer. The method further comprises the step of periodically presenting a clean contact medium in contact with the support surface. The removing and distributing step further comprises the step of positioning the contact medium adjacent to the support surface prior to the start of the metering step and removing the contact medium from the support surface prior to the finishing of the metering step.

In a further aspect of the invention, a blade clamp may be provided for the metering blade, which is formed from an elastomer material. The blade clamp has mating halves forming a channel for receiving the elastomeric blade. The channel has a first surface acting as a blade reference datum for the blade and opposing parallel surfaces normal to the first surface. One of the opposing surfaces has protrusions extending therefrom for engaging and deforming the elastomeric blade. The other surface has apertures formed therein that are somewhat larger than the protrusions and aligned with the protrusions. The mating apertures and protrusions secure the blade in place so that actual compression of the main body of the elastomeric blade does not occur. The two clamping surfaces, being larger relative to the protrusions, localize the deformation of the blade to the area around the protrusions. Blade clamp halves may be secured to one another with screws, a clamp, by use of a snap fit or the like.

It is an object of the present invention to provide an improved imaging method and apparatus which allows high quality imaging on a variety of media and obviates the need for separate cleaning apparatus and a separate cleaning step.

It is another object of the present invention to provide an improved imaging apparatus and method for imaging that utilizes a liquid layer on a supporting surface which receives the image to be transferred prior to transferring the image to a final receiving medium, which may be a transparency, paper or other suitable media.

It is yet another objective of the present invention to provide an improved apparatus and method for applying an intermediate transfer layer onto a support surface that concurrently removes foreign matter from and applies the liquid layer onto the support surface and uniformly distributes the liquid layer over the support surface.

It is a further objective of the present invention to provide a means for securing an elastomeric blade that localizes the deformation of a elastomeric blade used for metering the liquid layer over the support surface.

It is a feature of the present invention that the liquid layer is a sacrificial layer on the supporting surface which can at least partially be transferred with the transferred image to the final receiving medium.

It is another feature of the present invention that the liquid layer acts as a release agent on the supporting surface.

It is still another feature of the present invention that the supporting surface is a rotatable drum.

It is yet another feature of the present invention that the liquid layer can be selected from the group consisting of water, fluorinated oil, glycol, surfactant, mineral oil, silicone oil, functional oil and combinations thereof.

It is yet further a feature of the present invention that a simple path for the paper or final receiving medium through the imaging apparatus is obtained by the present invention to thereby minimize both the expense and the mechanical parts for paper or final medium handling and the amount of time needed for the apparatus to handle the final receiving medium.

It is another advantage of the present invention that the liquid layer is replenishable on the supporting surface for subsequent images and can at least partially be transferred with the image to the image receiving medium.

It is yet a further advantage of the present invention that high quality images can be produced on a variety of final receiving surfaces or media.

These and other objects, features and advantages are obtained by the apparatus and the method of utilizing that apparatus by applying a liquid layer to a supporting surface such that the liquid layer presents a first surface to receive the image which enhances the transferability of that image to a final receiving medium.

BRIEF DESCRIPTION OF THE DRAWINGS

The objects, features and advantages of the invention will become apparent upon consideration of the following detailed disclosure of the invention, especially when it is taken in conjunction with the accompanying drawings wherein:

FIG. 1 is a diagrammatic illustration of the apparatus having a supporting surface adjacent a liquid layer applicator, a metering blade and a print head which applies the image to be transferred to the liquid layer;

FIG. 2 is an enlarged diagrammatic illustration of the liquid layer acting as an intermediate transfer surface supporting the ink;

FIG. 3 is an enlarged diagrammatic illustration of the transfer of the inked image from the liquid intermediate transfer surface to a final receiving surface;

FIG. 7 is a perspective view of a blade clamp assembly for use in the apparatus for applying an intermediate transfer layer onto a support surface according to the present invention; and FIG. 8 is cross-sectional view through the blade clamp assembly for use in the apparatus for applying an intermediate transfer layer onto a support surface according to the present invention.

DETAILED DESCRIPTION OF THE PREFERRED EMBODIMENT

Figure 4:
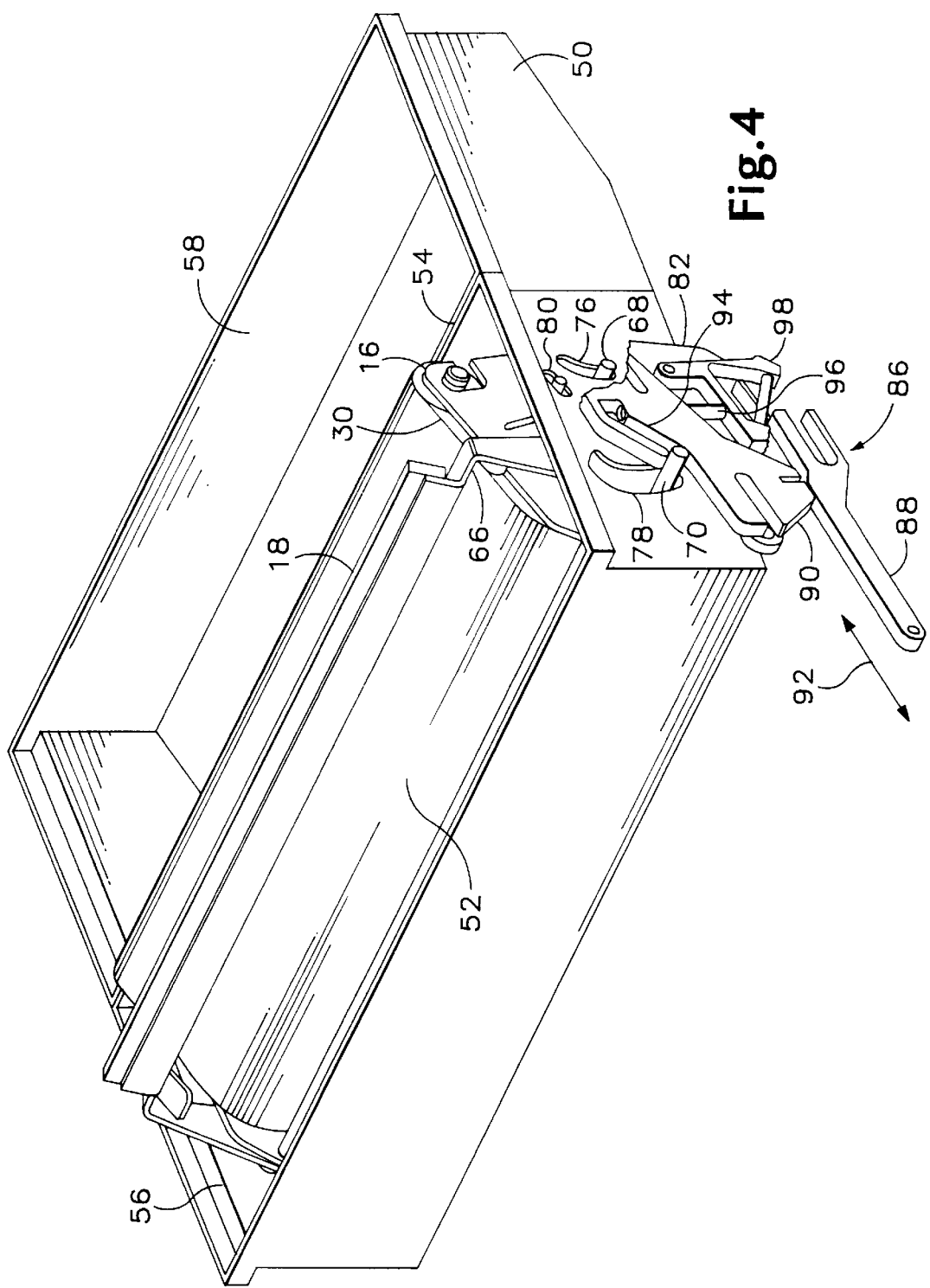
FIG. 4 is a perspective view of a removable cassette tray containing the apparatus for applying an intermediate transfer layer onto a support surface according to the present invention.

FIG. 1 discloses a diagrammatical illustration of the imaging apparatus 10 utilized in the instant process to transfer an inked image from an intermediate transfer surface to a final receiving substrate. A printhead 11 is supported by an appropriate housing and support elements (not shown) for either stationary or moving utilization to place an ink in the liquid or molten state on the supporting intermediate transfer surface 12 of FIGS. 2 and 3. The intermediate transfer surface 12 is applied to the surface of the supporting surface 14, which is shown as a drum, but may also be a web, platen, belt, band or any other suitable design. Intermediate transfer surface 12 is a liquid layer that is applied to the supporting surface 14 by contact with an applicator assembly 16, such as a liquid impregnated web, wicking pad, roller or the like. The liquid layer 12 is uniformly metered over the supporting surface by a blade 18 configured in a wiping mode. The supporting surface 14 may be formed from any appropriate material, such as metals including but not limited to aluminum, nickel or iron phosphate, elastomers including but not limited to fluoroelastomers, perfluoroelastomers, silicone rubber and polybutadiene, plastics including but not limited to polyphenylene sulfide loaded with polytetrafluorethylene, thermoplastics such as polyethylene, nylon, and FEP, thermosets such as acetals, or ceramics as long as the exposed surface is sufficiently rigid to deform the transferred image-forming ink 26 when the final receiving medium passes between it and the transfer and fixing roller 22 and sufficiently smooth so as not to interfere with the ability of the intermediate transfer surface or liquid layer 12 to support the image-forming ink 26 of FIG. 2. The preferred material is anodized aluminum.

Applicator assembly 16 includes a fabric or web material 30 impregnated with a release fluid, such as silicone oil or the like, that is wound on a supply core 32. The web material may be a thermal point bonded non-woven rayon-nylon fiber blend material or similar type of material impregnated with silicone oil. The material travels over a soft back-up device 34, such as a roller or pad, and is taken up on a take-up core 36. The back-up device 34 may be formed of an ethylene-propylene-diene terpolymer material (EPDM) belonging to the family of ethylene, propylene and elastomers when formed as a roller or a wedge shaped portion of a roller. The back-up device 34 may be formed of a polyester felt material when formed as a pad. The web material 30 passes through a nip 38 formed by the back-up device 34 and the support surface 14 causing the release fluid to be deposited on the support surface 14 as it is rotated. At the same time, foreign material on the support surface 14, such as untransferred ink, paper dust, and the like, is removed by the web material 30. The web material 30 is periodically incremented to introduce clean web material 30 into the nip 38 to eliminate the foreign material collected by the web material 30 and to supply the nip 38 with a sufficient amount of release fluid for distributing onto the drum 14 during the next operation of the applicator 16. As the release fluid is applied to the support surface 14, the blade 18, which may be formed of an elastomer material such as polyurethane or similar elastomer, uniformly distributes and removes excess fluid from the support surface 14. The blade 18, as illustrated in FIG. 1, is oriented in a configuration described as a wiper mode. Alternately, the applicator assembly 16 may include a wicking pad disposed within a reservoir containing the liquid. Dry web material 30, such as a polyester felt or the like, is drawn over the wicking pad which acts as the back-up device 34. The web material 30 is wetted by the wicking pad and passes through the nip 38 formed by the pad and the support surface 14 applying the liquid to the support surface 14 and removing foreign matter. A web advancing mechanism is provided to periodically present clean web material 30 in contact with the drum 14. The wicking pad and the web material 30 are preferably any appropriate non-woven synthetic textile with a relatively smooth surface. The configuration can employ the smooth wicking pad mounted atop a porous supporting material, such as a polyester felt. Both polyester felt materials are available from BMP Corporation as BMP products NR 90 and PE 700-UL, respectively.

FIG. 4 shows a perspective view of a removable cassette tray 50 containing the apparatus 52 for applying the intermediate transfer layer 12 onto the support surface 14. In the preferred embodiment of the invention the apparatus 52 includes the applicator assembly 16 and the blade 18 as a single removable unit. The cassette tray 50 is divided into two halves by a baffle 54 with the applicator assembly/blade unit 52 in one half 56 and the other half 58 acting as a waste ink receptacle.

Figure 5:
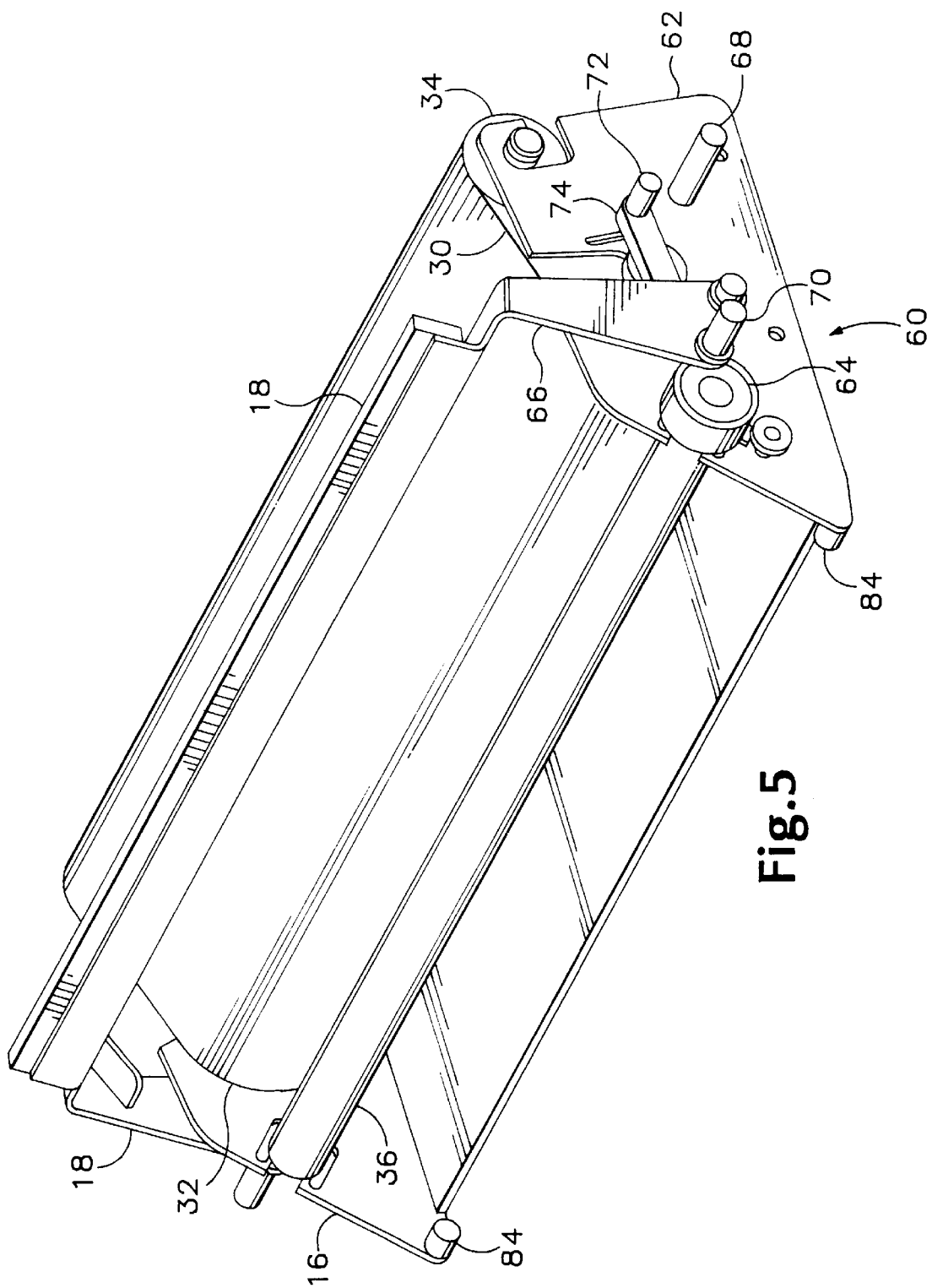
FIG. 5 is a perspective view of the apparatus for applying an intermediate transfer layer onto a support surface according to the present invention.

FIG. 5 shows a perspective view of the applicator assembly 16 and the blade 18 mounted in a frame 60 that allows for independent movement of each element to and from the support surface 14. The applicator assembly frame member 62 holds the supply core 32, the back-up device 34, the take-up core 36 and a friction clutch 64 connected to the take-up core 36. The applicator assembly frame member 62 also supports the blade frame member 66. Pins 68, 70 and 72 are respectively connected to the applicator assembly frame member 62, the blade frame member 66 and clutch arm 74, which is connected to the friction clutch 64. Pins 68, 70 and 72 extend through slots 76, 78 and 80 formed in the side of the cassette tray 50 with pins 68 and 70 engaging mechanical levers and cam followers positioned adjacent to the tray 50.

Pin 68 on the applicator assembly frame member 62 engages applicator assembly cam follower 82 that rides on an applicator assembly cam (not shown). Rotational movement of the applicator assembly cam causes the applicator assembly cam follower 82 to push up on pin 68 which causes rotational movement of the applicator assembly 16 about pivot points 84 to raise the applicator assembly 16 against the support surface 14. Each time the applicator assembly 16 is raised and lowered into position the friction clutch 64 is engaged causing the take-up core 36 to rotate which positions clean web material 30 in the nip 38.

An access door (not shown) is provided in the imaging apparatus 10 to allow removal and replacement of the cassette tray 50 and the applicator/blade unit 52. Opening and closing the door causes lateral movement of blade positioning mechanism 86 composed of levers 88 and 90, as shown by double arrow 92. One end of lever 88 is connected to the access door and the other end is connected to lever 90. With the access door in the open position pin 70 is positioned toward the bottom of slot 94 formed in lever 90. Closing the door causes pin 70 to ride up the slot 94 and be positioned over blade actuating pin 96. Optionally, pin 70 slides the full length of the slot 94 by the way of insertion motion of the cassette tray assembly 50, which would exclude the function provided by lever 88. Pin 70 rides up slot 94 and is actuated by an extension of cam follower 98. Rotational movement of the blade cam follower 98 in response to rotational movement of the blade actuating cam (not shown) pushes up on pin 70 raising the blade 18 into position adjacent to the support surface 14.

Independent movement of the applicator assembly 16 and the metering blade 18 produces a uniform distribution and thickness of the intermediate transfer layer 12 by preventing residual (untransferred) ink from contaminating the working area 44 of the blade 18 and eliminating significant unwanted non-uniformities (puddling) in the intermediate transfer layer 12. Actuating the applicator assembly 16 brings clean web material 30 into contact with the support surface 14 which removes contamination from the surface 14, keeping the blade 18 free of foreign material. The lifting of the web material 30 from the support surface 14 leaves areas of non-uniformity in the intermediate transfer layer 12, due to the dynamic contact between the support surface 14 and the web material 30. These areas of non-uniformity are eliminated by leaving the blade 18 in contact with the support surface 14 until the area left behind by the web material 30 has passed beyond the working area 44 of the blade 18. Actuation of the applicator assembly 16 and the blade 18 may also be made by means of any appropriate mechanism, such as an air cylinder, an electrically actuated solenoid, or the like.

Figure 6A:
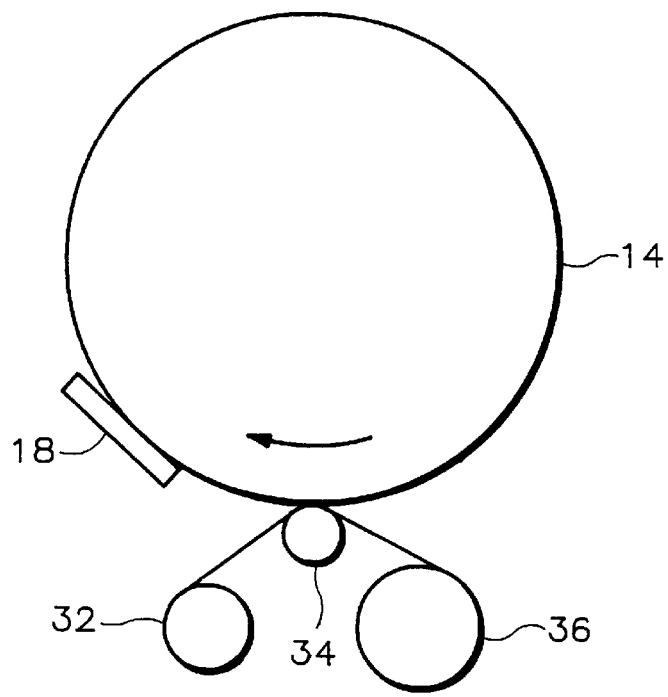
FIGS. 6A and 6B are respective views of alternative configurations for a metering blade used in the apparatus for applying an intermediate transfer layer onto a support surface according to the present invention.
Figure 6B:
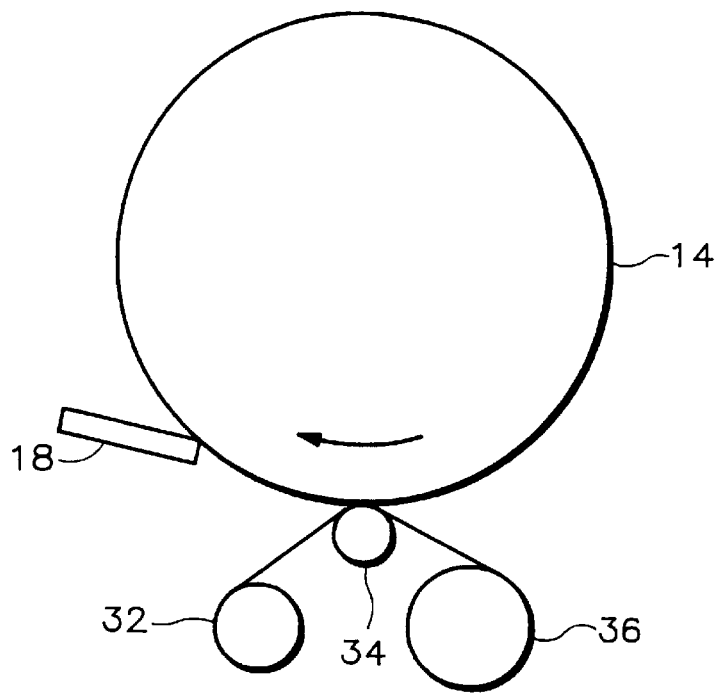

For uniform metering or distributing of the liquid as the intermediate transfer layer 12, the blade 18 is configured in the preferred embodiment in a wiper blade mode as shown in FIG. 1. The blade 18 is positioned adjacent to the surface 14 with the working area 44 being raised above the surface by hydrodynamic pressure of the liquid transfer layer 12. In the preferred embodiment, the positioning of the blade and the hydrodynamic pressure of the liquid combine to produce an intermediate transfer layer 12 having a thickness ranging from 0.05 to 10 microns with the preferred thickness being 0.17 microns. The amount of liquid applied to the support surface 14 by the web 30 should be adequate enough to form a continuous puddle of liquid along the working area 44 of the blade 18 as it meters the liquid over the surface. Additionally as shown in FIGS. 6A and 6B, blade 18 may also be configured in a side wipe mode or a doctor blade mode depending upon the specific requirements for the intermediate transfer layer thickness and uniformity.

FIG. 1 shows a final substrate guide 20 that passes the final receiving substrate 28, such as paper, from a positive feed device (not shown) and guides it through the nip formed by the opposing arcuate surfaces of the roller 22 and the intermediate transfer surface 12 supported by the drum 14. Stripper fingers 25 (only one of which is shown) may be pivotally mounted to the imaging apparatus 10 to assist in removing any paper or other final receiving substrate media from the exposed surface of the liquid layer forming the intermediate transfer surface 12. Roller 22 has a metallic core, preferably steel, with an elastomeric covering that contributes to a 40 to 45 Shore D rating for the overall system. Suitable elastomeric covering materials include silicones, urethanes, nitriles, EPDM and other appropriately resilient materials. The elastomeric covering on roller 22 engages the final receiving substrate 20 on the reverse side to which the ink image 26 is transferred from the exposed surface of the liquid layer forming the intermediate transfer surface 12. This fuses or fixes the ink image 26 to the surface of the final receiving surface so that the ink image is spread, flattened and adhered.

The ink utilized in the process and system of the instant invention is preferably initially in solid form and is then changed to a molten state by the application of heat energy to raise the temperature from about 85° C. to about 150° C. Elevated temperatures above this range will cause degradation or chemical breakdown of the ink. The molten ink is then applied in raster fashion from the ink jets in the printhead 11 to the exposed surface of the liquid layer forming the intermediate transfer surface 12, where it is cooled to an intermediate temperature and solidifies to a malleable state in which it is transferred to the final receiving surface 28 via a contact transfer by entering the nip between the roller 22 and the liquid layer forming the intermediate transfer surface 12 on the support surface or drum 14. This intermediate temperature where the ink is maintained in its malleable state is between about 30° C. to about 80° C.

Once the solid malleable ink image enters the nip, it is deformed to its final image conformation and adheres or is fixed to the final receiving substrate either by the pressure exerted against ink image 26 on the final receiving substrate 28 by the roller 22 alone, or by the combination of the pressure and heat supplied by heater 21 and/or heater 19. Heater 24 could optionally be employed to supply heat to facilitate the process at this point. The pressure exerted on the ink image 26 is between about 10 to about 2000 pounds per square inch (psi), more preferably between about 500 to about 1000 psi, and most preferably between about 750 to about 850 psi. The pressure must be sufficient to have the ink image 26 adhere to the final receiving substrate 28 and be sufficiently deformed to ensure that light is transmitted through the ink image rectilinearly or without deviation in its path from the inlet to the outlet, in those instances when the final receiving substrate is a transparency. Once adhered to the final receiving substrate 28, the ink image cools to ambient temperature of about 20–25 degrees Centigrade. The ink comprising the ink image must be ductile, or be able to yield or experience plastic deformation without fracture at a temperature above the glass transition temperature. Below the glass transition temperature the ink is brittle. The temperature of the ink image in the ductile state is between about −10° C. and to about the melting point or less than about 85° C.

FIG. 3 diagrammatically illustrates the sequence involved when an ink image 26 is transferred from the liquid layer forming the intermediate transfer surface 12 to the final receiving substrate 28. As seen in FIG. 3, the ink image 26 transfers to the final receiving substrate 28 with a small, but measurable quantity of the liquid in the intermediate transfer surface 12 attached thereto as an outer layer 29. The average thickness of the transferred liquid layer 29 is calculated to be about 0.8 nanometers. Alternatively, the quantity of transferred liquid layer 29 can be expressed in terms of mass as being from about 0.1 to about 200 milligrams, and more preferably from about 0.5 to about 50 milligrams, and most preferably from about 1 to about 10 milligrams per page of final receiving substrate 28. This is determined by tracking on a test fixture the weight loss of the liquid in the applicator assembly 16 at the start of the imaging process and after a desired number of sheets of final receiving substrate 28 have been imaged.

Some appropriately small and finite quantity of the liquid in the liquid layer forming the intermediate transfer surface 12 also is transferred to the final receiving substrate in areas adjacent the transferred ink image 26. This relatively small transfer of the liquid from the intermediate transfer surface 12 with the ink image 26 and to the non-imaged areas on the final receiving substrate 28 may permit more than page of the final receiving substrate 28 to be imaged before it is necessary to replenish the sacrificial liquid layer forming the intermediate transfer surface 12. Preferably, the liquid layer is replenished before each imaging. Transparencies and paper are the primary intended media for image receipt. Commonly called "plain paper" is the preferred medium, such as that supplied by Xerox Corporation and many other companies for use in photocopy machines and laser printers. Many other commonly available office papers are included in this category of plain papers, including typewriter grade paper, standard bond papers, and letterhead paper. Hammermill laser print paper is assumed to be a representative grade of plain paper for the purposes of this invention.

While the thickness of the liquid layer forming the intermediate transfer surface 12 on the supporting surface or drum 14 can be measured, such as by the use of reflectance Fourier Transform infrared spectroscopy or a laser interferometer, it is theorized that the thickness can vary from about 0.01 microns to about 50 microns, more preferably from about 0.05 to about 10 microns, and most preferably from about 0.1 to about 1 microns. The thickness of the layer forming the intermediate transfer surface 12 can increase if rougher surfaced supporting surfaces or drums 14 are employed. The surface topography of the supporting surface or drum 14 can have a roughness average ($R_a$) of from about 1 microinch to about 100 microinches, and a more preferred range of from about 3 to about 15 microinches. The image quality will degrade when a liquid layer thicker than about 10 microns is used to form the intermediate transfer surface 12.

Suitable liquids that may be employed as the intermediate transfer surface 12 include water, fluorinated oils, glycol, surfactants, mineral oil, silicone oil, functional oils or combinations thereof. Functional oils can include, but are not limited to, mercapto-silicone oils, fluorinated silicone oils and the like.

It is important in the distributing and metering of the liquid for the intermediate transfer layer 12 that the blade 18 be precisely positioned relative to the support surface and that the functional area 44 of the blade not be deformed. Precise alignment and deformation are problems when the blade 18 is made from elastomer materials, such as urethane or the like. Any deformation of the functional area 44 by extraneous forces, such as clamping, causes functional problems. In addition, elastomer blades have a tendency to creep or move after clamping. One method of preventing deformation of the elastomer blade 18 is to secure it to blade frame member 66, shown in FIG. 5, using an epoxy glue, transfer adhesive tape, hot melt adhesive, or the like. Alternately, a blade clamp 100, as shown in FIGS. 7 and 8, can be used for holding the elastomer blade 18 which does not impose any global deformation of the blade material and leaves the functional area 44 of the blade unaffected. Since the relationship between the functional area 44 and the support surface 14 is critical, the blade clamp 100 includes a datum surface 102 for referencing the position of the blade 18 to control the relationship of the functional area 44 to the surface 14.

The blade clamp 100 is composed of two halves, 104 and 106, that are fastened together to form a channel 108 in which the elastomer blade 18 rests. One of the halves 104 has small protrusions 110 formed in it that are forced into the blade 18 when the clamp 100 is assembled. The protrusions 110 can be of various configurations, such as square, round, or the like. The mating half 106 of the clamp 100 has apertures or holes 112 formed in it that align with the protrusions 110 in the other blade half 104. The apertures 112 are slightly larger than the protrusions 110 for localizing the deformation of the elastomer material around the hole 112. Without the apertures 112, the blade 18 would be constrained and the deformation of the elastomer would reach the functional area 44 of the blade 18. In one possible implementation of the clamp, the blade clamp halves 104 and 106 have aligned apertures 114 for receiving screws 116 that secure the blade halves together. Alternately, the blade clamp halves 104 and 106 are held together by using molded in snaps. In either case, the clamping force exerted on the blade is limited by the geometry and stiffness of the clamp halves over the clamping area by provision of the offset joining surfaces. The blade clamp assembly may be mounted on the blade frame member 66 shown in FIGS. 4 and 5.

The liquid layer 12 that forms the intermediate transfer surface on the surface of drum 14 is heated by an appropriate heater device 19. Heater device 19 may be a radiant resistance heater positioned as shown or positioned internally within the drum 14. Heater devices 21 and 24 can also be employed in the paper or final receiving substrate guide apparatus 20 and in the fusing and fixing roller 22, respectively. Heater device 19 increases the temperature of the liquid intermediate transfer surface from ambient temperature to between about 25° C. to about 70° C. or higher. This temperature is dependent upon the exact nature of the liquid employed in liquid layer or intermediate transfer surface 12 and the ink employed. A more preferred range is between about 30° C. to about 60° C., and a most preferred range is from about 45° C. to about 52° C.

Heater 21 preheats the final receiving medium prior to the fixation of the ink image by being set to heat between about 70° C. to about 200° C., more preferably to between about 85° C. and about 140° C., and most preferably to between about 110° C. to about 130° C. It is theorized that heater 21 raises the temperature of the final receiving medium to between about 90° C. and about 100° C. However, the thermal energy of the receiving media is kept sufficiently low so as not to melt the ink upon transfer to the final receiving substrate 28. Heater 24, when employed, heats the transfer and fixing roller 22 to a temperature of between about 25° C. and about 200° C. and alternatively may be employed internally within roller 22.

The ink used to form the ink image 26 preferably must have suitable specific properties for viscosity. Initially, the viscosity of the molten ink must be matched to the requirements of the ink jet device utilized to apply it to the intermediate transfer surface 12 and optimized relative to other physical and rheological properties of the ink as a solid, such as yield strength, hardness, elastic modulus, loss modulus, ratio of the loss modulus to the elastic modulus, and ductility. The viscosity of the phase change ink carrier composition has been measured on a Ferranti-Shirley Cone Plate Viscometer with a large cone. At about 140° C. a preferred viscosity of the phase change ink carrier composition is from about 5 to about 30 centipoise, more preferably from about 10 to about 20 centipoise, and most preferably from about 11 to about 15 centipoise. The surface tension of suitable inks is between about 23 and about 50 dynes/centimeter. An appropriate ink composition is that described in U.S. Pat. No. 4,889,560 issued Dec. 26, 1989 and assigned to the assignee of the present invention.

Such an ink has a composition comprising a fatty amide-containing material employed as a phase change ink carrier composition and a compatible colorant. The fatty amide-containing material comprises a tetraamide compound and a monoamide compound. The phase change ink carrier composition is in a solid phase at ambient temperature and in a liquid phase at elevated operating temperature. The phase change ink carrier composition can comprise from about 10 to about 50 weight percent of a tetraamine compound, from about 30 to about 80 weight percent of a secondary monoamide compound, from about 0 to about 40 weight percent of a tackifier, from about 0 to about 25 weight percent of a plasticizer, and from about 0 to about 10 weight percent of a viscosity modifying agent.

The subject phase change ink used in the instant invention is formed from a phase change ink carrier composition which exhibits excellent physical properties. For example, the subject phase change ink, unlike prior art phase change inks, exhibits a high level of lightness, chroma, and transparency when utilized in a thin film of substantially uniform thickness. This is especially valuable when color images are conveyed using overhead projection techniques. Furthermore, the preferred phase change ink compositions exhibit the preferred mechanical and fluidic properties mentioned above when measured by dynamic mechanical analyses (DMA), compressive yield testing and viscometry. More importantly, these work well when used in the printing process of the instant invention utilizing a liquid layer as the intermediate transfer surface. The phase change ink composition and its physical properties are discussed in greater detail in copending U.S. Pat. No. 5,372,852 issued Dec. 13, 1994 and assigned to the assignee of the present invention.

The transmission spectra for each of the phase change inks used in the process of this invention were evaluated on a commercially available spectrophotometer, the ACS Spectro-Sensor II, in accordance with the measuring methods stipulated in ASTM 1E805 (Standard Practice of Instrumental Methods of Color or Color Difference Measurements of Materials) using the appropriate calibration standards supplied by the instrument manufacturer. For purposes of verifying and quantifying the overall calorimetric performance of the inks used in the process and as a part of this invention, measurement data were reduced, via tristimulus integration, following ASTM E308 (Standard Method for Computing the Colors of objects using the CIE System) in order to calculate the 1976 CIE L* (Lightness), a* (redness-greenness), and b* (yellowness-blueness), (CIELAB) values for each phase change ink sample. In addition, the values for $Q_{hab}$ELAB Psychometric Chroma, $C^*_{ab}$, and CIELAB Psychometric Hue Angle, were calculated according to publication CIE15.2, Colorimetry (Second Edition, Central Bureau de la CIE, Vienna, 1986).

Unlike conventional phase change ink carriers, the nature of the phase change ink carrier composition of the inks used in the process of the present invention is such that thin films of substantially uniform thickness exhibit a relatively high L* value. For example, a substantially uniform thin film of about 20 micron thickness of the phase change ink carrier composition of this invention preferably has an L* value of at least about 65, more preferably at least about 75, and most preferably at least about 85.

The phase change inks used herein have a relatively high C*ab value when measured as a thin film of substantially uniform thickness. Previously, conventional phase change inks have had a very low degree of rectilinear light transmissivity, even in thin films of substantially uniform thickness. The phase change ink composition used in the process of this invention has C*ab values, when applied as a substantially uniform thin film of about 10 micron thickness with subtractive primary yellow, magenta and cyan color phase change ink compositions, that preferably are at least about 40 for said yellow ink composition, at least about 65 for said magenta ink composition, and at least about 30 for the cyan ink composition.

It is also important that the black color phase change ink component be at a minimum light transmissivity level so that the color intensity of the ink is maximized. Accordingly, the L* value of a substantially uniform thin film of about 10 microns thickness of a black color phase change ink is preferably not more than about 35, more preferably not more than about 30, and most preferably not more than about 25.

The respective phase change ink and ink carrier compositions, when transferred to the final substrate in a thin film, are quite durable. One indication of durability is abrasion resistance. For purposes of this invention, abrasion resistance is determined by testing a finished print sample of the phase change ink produced from the carrier composition in a Teledyne Taber Abrader, Model 5130, utilizing CS-230 Abrasion wheels loaded with 500 gram weights. The abrasion wheels are resurfaced after each sample with an S-11 resurfacing disk. Samples printed on paper were tested according to ASTM D406(F84 (Standard Test Method For Abrasion Resistance of Organic Coatings by the Taber Abrader). Samples printed on light transmissive thin films were tested using ASTM D1304Q-85 (Standard Test Method For Resistance of Transparent Plastics to Surface Abrasion). Print samples were tested as described above, and the results of those tests demonstrated excellent abrasion resistance.

A further test employed to evaluate the durability of phase change inks and ink carrier compositions is an offset transfer or blocking test. This determines whether the phase change ink printed on a substrate will adhere to an adjacent substrate at ambient or elevated temperatures when the printed products are stacked one on top of the other. The blocking test is conducted using an indirect transfer method by printing samples of the phase change ink produced from the carrier composition onto a paper or thin film substrate and placing that substrate in a manila folder under a one pound piece of aluminum, about 8.5 inches wide and about 11 inches long to evenly distribute the weight of a 10 pound block. These printed samples are placed in an oven for 24 hours at a constant temperature of about 60° C. Print samples of the phase change ink of the present invention, subjected to the above described blocking test showed no blocking.

The above-defined DMA properties of the phase change ink compositions were experimentally determined. These dynamic measurements were done on the Rheometrics Solids Analyzer (RSA II) manufactured by Rheometrics, Inc. of Piscataway, N.J., using a dual cantilever beam geometry. The dimensions of the sample were about 2.0±1.0 mm thick, about 6.5±=0.5 mm wide, about 54.0±1.0 mm long. A time/cure sweep was carried out under a desired force oscillation or testing frequency of about 1 Hz and an auto-strain range of about 1.0×10-5% to about 1%. The temperature range examined was about −60° to about 90° C. The preferred phase change ink compositions typically are (a) flexible at a temperature of about −10° to about 80° C., (b) have a temperature range for the glassy region from about −100° to 40° C., the value of E' being from about $1.5 \times 10^9$ to $1.5 \times 10^{11}$ dyne/cm2, (c) have a temperature range for the transition region from about −30° to about 60° C., (d) have a temperature range for the rubbery region of E' from about −10° to 100° C., the value of E' being from about $1.0 \times 10^6$ to $1.0 \times 10^{11}$, and (e) have a temperature range for the terminal region of E' from about 30° to about 160° C. Furthermore, the glass transition temperature range of the phase change ink compositions are from about −40° to about 40° C., the temperature range for integrating under the tan δ peak of the phase change ink composition is from about −80° to about 80° C. with integration values ranging from about 5 to about 40, and the temperature range for the peak value of tan δ of the phase change ink is from about −40° to about 40° C. with a tan δ of about $1.0 \times 10^{-2}$ to about $1.0 \times 10$ at peak.

A representative plot of the storage modulus, E', as a function of temperature at 1 Hz for an appropriate phase change ink composition for use in the printing process of the present invention can be produced. The curve will be divided up into four distinct regions: glassy, transition, rubbery, and terminal.

In the glassy region the ink behaves similar to a hard, brittle solid i.e., E' is high, about $1 \times 10^{10}$ dyne/cm$^2$. This is because in this region there is not enough thermal energy or long enough time for the molecules to move. This region needs to be well-below room temperature so the ink will not be brittle and affect the room temperature performance on paper.

The transition region is characterized by a large drop in the storage modulus of about one order of magnitude. This is because the molecules have enough thermal energy or time to undergo conformational changes. In this region, the ink changes from being hard and brittle to being tough and leathery.

The rubbery region describes a slightly decreasing plateau. In this region, there is a short term elastic response to the deformation that gives the ink its flexibility. It is believed that the impedance to motion or flow in this region is due to entanglements or physical cross-links from crystalline domains. Fine tuning of the ink to get this plateau in the appropriate temperature range for good transfer and fixing and room temperature performance is of great importance in formulating these phase change ink compositions. The rubbery region encompasses the ink in both its malleable state during the transfer and fixing or fusing step and its final ductile state on the final receiving substrate.

Finally, in the terminal region, there is another drop in the modulus. It is believed in this region that the molecules have sufficient energy or time to flow and overcome the entanglements.

The general temperature profile of tan δ for a phase change ink composition for use in the printing process of the present invention can be described as follows. In the glassy region, tan δ is small. The peak of the damping curve occurs in the transition region and indicates the $T_g$ of the material. The area under the tan δ curve gives an indication of the relative toughness of the ink, which is a measure of the energy dissipated during deformation. Since tan δ is equal to the loss modulus divided by the storage modulus, it is not necessary to specify the profiles of both the tan δ and loss modulus.

The phase change ink compositions were also analyzed by compressive yield testing. The compressive yield strength measurements were done on an MTS SINTECH 2/D mechanical tester manufactured by MTS Sintech, Inc. of Cary, N.C., using small cylindrical sample blocks. The dimensions of a typical sample are about 19.0±1.0 mm×about 19.0±1.0 mm. Isothermal yield stress was measured as a function of temperature (about 25° to about 80° C.) and strain rate. The material was deformed up to about 40%.

The preferred yield stresses as a function of temperature for suitable phase change ink compositions for use in the indirect printing process of the present invention are described by an equation as follows:

$$YS = mT + I$$

wherein YS, which is a function of temperature, is the yield stress, m is the slope, T is the temperature, and I is the intercept.

Under non-process conditions, i.e., after the final printed product is formed or conditions under which the ink sticks are stored, and the ink is in a ductile state or condition at a temperature range of from at least about 10° to about 60° C., the preferred yield stress values are described by m as being from about −9±−2 to about −36±−2 and I as being from about 800±100 psi to about 2200±100 psi. More preferably, m is about −30±−2 and I is about 1700±100 psi. Under process conditions, i.e., during the indirect printing of the ink from an intermediate transfer surface onto a substrate while the ink is in a malleable condition or state, at a temperature of from at least about 40° to about 80° C., the preferred stress values are described by m as being from about −6±−2 to about −36±−2 and I as being from about 800±100 psi to about 1600±100 psi. More preferably, m is about −9±−2 and I is about 950±100 psi.

In operation the support surface or drum 14 has a layer of liquid intermediate transfer surface applied to its surface by the action of the applicator assembly 16. Assembly 16 is raised by the action of the applicator assembly cam and cam follower 82 until the web material 30 is in contact with the surface of the drum 14. The liquid, retained within the web material 30, is deposited on the surface of the drum 14 while at the same time any foreign material on the drum surface is captured by the web material 30. The drum 14 rotates about a journalled shaft in the direction shown in FIG. 1. The blade 18 is raised to uniformly meter the liquid layer 12 after the start of the new liquid layer 12 has passed the blade 18. This prevents any foreign material left over from the previous imaging from contaminating the working area 44 of the blade 18. Heater 19 heats the liquid layer 14 and the surface of the drum 14 to the desired temperature. Once the entire periphery of the drum 14 has been coated, the applicator assembly 16 is lowered to a non-contact position. The blade 18 continues to meter the liquid over the drum surface 14 until the blade passes over the region where the applicator assembly 16 withdrew from the drum surface whereupon the blade 18 is lowered to a non-contact position. This delayed withdrawal of the blade 18 assures that no significant puddling is left on the drum surface 14 by the applicator assembly 16. The result is a uniform liquid layer forming the intermediate transfer surface 12 on the exterior of the drum 14.

Ink is applied to the exposed surface of the liquid intermediate transfer surface 12 by the printhead 11. The ink is applied in molten form, having been melted from its solid state form by appropriate heating means 13. The ink image 26 solidifies on the surface of the liquid by cooling to a malleable intermediate state. The drum continues to rotate, entering the nip formed by the roller 22 and the curved surface of the intermediate transfer surface 12 supported by the drum 14. The ink image 26 is deformed to its final image conformation and adhered to the final receiving surface 28 by being pressed there against. The ink image 26 is thus transferred and fixed to the final receiving surface 28 by the pressure exerted on it in the nip by the resilient or elastomeric surface of the roller 22. Stripper fingers 25 help to remove the imaged final receiving surface 28 from the liquid intermediate transfer surface 12 as the drum rotates. The ink image 26 then cools to ambient temperature where it possesses sufficient strength and ductility to ensure its durability.

After the image is transferred to the final receiving surface 28 and before the next imaging, the applicator assembly 16 and blade 18 are actuated to raise upward into contact with the drum 14 to replenish the liquid forming the surface 12.

The following examples are presented to illustrate the scope of the invention and to be illustrative of the type of materials that can be successfully employed as the liquid intermediate transfer surface 12, without any intent to limit the invention to the specific materials, process or structure employed.

EXAMPLE I

A test fixture having a rotatably mounted aluminum drum coated with drafting Mylar® about 0.004 inch thick with the matte side of the plastic facing out and a diameter of about 4.13 inches was positioned adjacent and in close proximity to a transfer and fusing roller of smaller diameter. A piezoelectrically driven printhead with phase change ink was positioned intermediate of the drum and the transfer and fusing roller to deliver the primary colors of cyan, magenta, yellow and black to the exposed surface of a thin liquid layer of an intermediate transfer surface in raster fashion. The drum surface was hand coated with a liquid layer consisting of a mixture of about 79.5% by weight deionized water, about 20% by weight polyethylene glycol available as PEG 200 from Aldrich Chemical Company, and about 0.5% by weight of a fluorinated surfactant leveling agent commonly used in epoxies and available from the 3M Company under the tradename Fluorad FC-430 coating additive. This mixture was applied with a hand wipe available from Kimberly-Clark under the KAYDRY tradename to form the liquid intermediate transfer surface. The liquid layer was not entirely evenly applied to the drum surface since more thickly coated areas were noticeably visible. Application time for the liquid layer was about 600 milliseconds, or less than 2 revolutions of the drum at the imaging speed, with an application pressure estimated at about 8 pounds per square inch. The drum temperature was maintained at about 29 to about 30 degrees Centigrade. Paper was used as the final receiving substrate and was preheated by an external heating device with a setpoint temperature setting of about 100 degrees Centigrade prior to being brought into contact with the transferred ink image. The transfer and fusing roller was also heated by an external heating device having a setpoint of about 120 degrees Centigrade.

During imaging the drum was rotated at a surface speed of about 33.3 inches per second. During transfer and fixing, the surface speed of the roller was about 5 inches per second. A full color image of a crane was imaged by the printhead on the liquid intermediate transfer layer and transferred to Xerox 4024 plain copy paper. The transferred image was of good quality with only a few pixels left untransferred to the paper.

EXAMPLE II

The same test fixture and conditions as described above were employed, except that the liquid used to form the liquid intermediate transfer layer was an alkylphenyl polyglycol nonionic surfactant sold under the tradename Tritons X-100 by Spectrum Chemical Manufacturing Corporation of Gardenia, Calif. Multiple copies of the same crane image were made, producing prints with somewhat tacky imaged areas. When the print sheets were stacked one on top of another, some parts of the color image were transferred to the back of the overlying sheet of paper. It appeared as though the liquid used as the intermediate transfer layer penetrated the ink, partially plasticizing it. However, the inked image was successfully transferred from the liquid intermediate transfer surface to the paper.

EXAMPLE III

The same test fixture and conditions as were utilized in Example I were employed, except that the fluorinated surfactant leveling agent sold under the tradename Fluorad FC-430 by 3M Corporation was employed as the liquid intermediate transfer surface. Two prints were made of the full color crane image, with incomplete areas of transfer and a slightly tacky feeling in the printed areas.

EXANPLE IV

The same test fixture and conditions as were utilized in Example I were employed, except that the liquid was applied with a wick/felt laminate applicator having a steel backing plate, which was removed from a Minolta copier. The applicator was intended to deliver silicone oil in a wicking fashion. The applicator had a force measured in air pressure of about 19.5 pounds per square inch or about 15 pounds of force pressing it against the surface of the drum while applying the liquid layer. About 80 cubic centimeters of the liquid was placed into the applicator's reservoir. Five prints were made at the initial transfer and fixing speed of about 5 inches per second. The speed was increased by about 1 inch per second up to about 11 inches per second until a total of 51 full color crane prints were made, including 2 transparencies made at a fixing speed of about 11 inches per second. About 70 cubic centimeters of the liquid in the applicator's reservoir were used. Successful transfers were made at each transfer speed, but abrasion testing disclosed a gradual decrease in adherence of the images to the paper at the higher transfer speeds. Acceptable quality color prints were made up to transfer speeds of about 7 inches per second. It was theorized that successful transfers could be achieved at higher transfer speeds by modifying some of the transfer and fusing conditions.

EXAMPLE V

The same test fixture and conditions as were utilized in Example I were employed, except that the liquid was deionized water and was applied with a wick/felt laminate applicator to a depth of about 1 mil. The applicator was removed from a Minolta copier and employed a steel backing plate. The liquid was intended to be delivered in a wicking fashion. The applicator had a force measured in air pressure of about 23.3 pounds per square inch, or about 18 pounds of force, forcing it against the surface of the drum while applying the liquid layer. About 80 cubic centimeters of the liquid was placed into the applicator's reservoir. Several prints were made of a four color bar pattern at an initial transfer and fixing speed of about 5 inches per second. The imaging surface speed was about 23.3 inches per second with an application time at the imaging speed of about one second. The ink drop ejection rate was set at about 7 Khz. The heater for the final receiving substrate, which in this case was paper, was set at about 100 degrees Centigrade. The transfer and fixing roller's heater had a set point of about 120 degrees Centigrade. The surface of the drum supporting the liquid layer was heated to between about 30 to about 50 degrees Centigrade, more preferably to between 40 and 50 degrees Centigrade, which caused some accelerated evaporation of the deionized water forming the liquid layer and required a relatively fast transfer speed. Successful four color transfers were made with each attempt, although it appeared that too thick of a layer of the deionized water would result in displaced dots.

EXAMPLE VI

The same test fixture and conditions as were utilized in Example I were employed, except that Genesee Polymer corporation mercapto modified silicone oil sold under the tradename GP-21-55 was employed as the liquid intermediate transfer surface. The about 3.9770 diameter aluminum support drum had about a 0.001 inch thick plating of copper thereon. The drum temperature was maintained at about 47.5 degrees Centigrade. A good quality print was made of the full color crane image, with some incomplete areas of image transfer, despite a paper jam problem which occurred upon feeding. At lower drum temperatures, the copies made had significant quantities of the pixels not transferred to the paper. At temperatures above about 50 degrees Centigrade, the copies made had large numbers of pixels from the center band of the image remain on the liquid layer forming the intermediate transfer layer, until a temperature of about 50 degrees centigrade caused the ink to melt.

EXAMPLE VII

A test fixture similar to that employed in Example I was used, except that the support drum was aluminum with an anodized surface finish that was diamond turned and non-reflective. The drum had a diameter of about 3.979 inches and was internally heated with a coaxially mounted quartz heater lamp that was linked to a control with an established setpoint of about 47 degrees Centigrade.

The heated drum surface was coated with silicone oil sold under the tradename Dow Corning 200. The oil was applied by being contacted for less than about 0.6 seconds during two rotations of the drum at an application speed of about 40 inches per second with an oil impregnated polyester web contained within a raisable cassette assembly. The web was pressed into contact with the drum surface with a force of about 10 pounds. Once the drum surface was fully coated with the liquid layer that forms the intermediate transfer surface, the cassette assembly lowered out of contact with the drum.

The paper final receiving substrate was preheated by a flat and flexible vulcanized silicone heater located within the paper feed guides and having a temperature setpoint of about 120 degrees Centigrade. The transfer and fusing roller had a diameter of about 1.5 inches and a length of about 10 inches. The roller was not heated and was maintained at an ambient temperature of about 45 degrees Centigrade. The roller applied a nip pressure of about 750 to about 850 pounds per square inch. The roller was coated with about a 0.09 inch thick Shore D 40 elastomer.

A full color crane image was created on the liquid layer of silicone oil forming the intermediate transfer surface under the same conditions as were utilized for imaging in Example I and was transferred to xerox 4024 plain copy paper. The transferred image was of excellent quality with no untransferred pixels left behind on the liquid layer.

While the invention has been described above with reference to specific embodiments thereof, it is apparent that many changes, modifications and variations in the materials, arrangements of parts and steps can be made without departing from the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

What is claimed is:

1. An apparatus for applying an intermediate liquid transfer surface onto a support surface in an ink jet printer, the printer having a print head mounted thereon for applying phase change ink image-wise to the intermediate liquid transfer surface, the apparatus comprising:

an applicator assembly connected to the printer adjacent the support surface mounted in a removable cassette tray for distributing a liquid layer onto the support surface to produce the intermediate transfer surface, the applicator assembly further having a liquid impregnated contact medium with a contact surface for concurrently removing foreign matter from and delivering the liquid onto the support surface;

means for metering the liquid layer uniformly on the support surface, the applicator assembly and metering means being a single unit in the removable cassette tray located adjacent and below the intermediate liquid transfer surface and the support surface; and an open-topped waste ink receptacle in the removable cassette tray separate from the applicator assembly and metering means for collecting waste ink from the support surface, the waste ink receptacle being separated from the applicator assembly and positioned directly below the print head to collect solid waste ink therefrom.

2. The apparatus as recited in claim 1 wherein the contact medium is a liquid impregnated web periodically incremented for presenting a clean web surface in contact with the support surface.

3. The apparatus as recited in claim 2 wherein the applicator assembly further comprises a supply means for storing a quantity of the clean web material and a take-up means for receiving soiled web material.

4. The apparatus as recited in claim 2 wherein the applicator assembly further comprises a back-up means selectively positioned adjacent to the support surface for forming a nip therebetween for capturing the web material therein for removing the foreign matter from and depositing the liquid on the support surface.

5. The apparatus as recited in claim 1 further comprising means for independently controlling the applicator assembly and the metering means with the applicator assembly being positioned against the support surface prior to the metering means and removed from the support surface before the metering means.

6. The apparatus as recited in claim 1 wherein the support surface is a rotatable drum mounted to an imaging apparatus with the liquid layer having a first surface in contact with the drum and an exposed second surface not in contact with the support surface.

7. The apparatus as recited in claim 6, wherein the imaging apparatus further includes a heating means to melt a solid ink from the solid state to a molten state prior to the ejection from the ink jet print head.

8. The apparatus as recited in claim 7 in which the ink applied to the exposed surface of the liquid layer cools and solidifies to a malleable condition prior to transfer to a final receiving medium.

9. The apparatus as recited in claim 7 wherein the imaging apparatus further comprises a transfer apparatus that includes a roller to pressure fuse the ink image to a final receiving medium by deforming the ink image and adhering the image thereto.

10. The apparatus as recited in claim 9 wherein the imaging apparatus further comprises an apparatus to cool the transferred and deformed ink image to a ductile and fracture resistant condition at ambient air temperature.

11. The apparatus as recited in claim 1 wherein the metering means comprises a blade disposed adjacent to the support surface.

12. The apparatus as recited in claim 11 wherein the blade comprises an elastomer material having an area acting as a wiping surface for uniformly distributing the liquid layer over the support surface.

13. The apparatus as recited in claim 12 further comprising a blade clamp having mating halves forming a channel for receiving the elastomer material with the channel having a first surface acting as a blade reference datum for the blade and opposing parallel surfaces normal to the first surface with one of the opposing surfaces having protrusions extending therefrom for engaging and deforming the elastomer material and the other surface having apertures formed therein aligned with the protrusions for localizing the elastomer deformation around the protrusions and apertures, and means for securing the blade clamp halves together.

14. The apparatus as recited in claim 13 wherein the apertures formed in one of the opposing parallel surfaces are of a size greater than the protrusions in the other parallel surface.

15. The apparatus as recited in claim 13 wherein the protrusions are raised square bumps.

16. A method of applying an intermediate liquid transfer surface onto a support surface of an ink jet printer having a print head mounted thereon for applying phase change ink in an image-wise fashion to the intermediate liquid transfer surface, comprising the steps of:

concurrently removing foreign matter from and distributing a liquid layer onto the support surface using a liquid impregnated contact medium in contact with the support surface with the contact medium being disposed on a removable applicator assembly, the liquid layer serving as the intermediate transfer layer having an exposed surface not in contact with the support surface and an opposing second surface in contact with the support surface;

metering the liquid layer uniformly on the support surface using a blade; and collecting waste ink in a separate open-topped waste ink receptacle area positioned directly below the print head and the support surface in the removable applicator assembly.

17. The method as recited in claim 16 further comprising the steps of:

imaging the exposed surface of the liquid layer to form an image thereon; and transferring the image to a receiving medium.

18. The method as recited in claim 16 further comprising the step of periodically presenting a clean contact medium in contact with the support surface.

19. The method as recited in claim 16 wherein the removing and distribution step further comprises positioning the contact medium adjacent to the support surface prior to the start of the metering of the liquid layer and removing the contact medium from the support surface prior to the finish of the metering of the liquid layer.

20. The method as recited in claim 18 further comprising reapplying liquid to the liquid layer serving as the intermediate transfer surface on the support surface to renew the liquid layer subsequent to presenting a clean contact medium in contact with the support surface.

21. The method as recited in claim 16 further comprising using as the liquid layer one selected from the group consisting of water, a fluorinated oil, glycol, mineral oil, silicone oil, a surfactant, a functional oil, or combination thereof.

22. The method as recited in claim 17 further comprising using a phase change ink to form the image so that the ink is changed from a solid state to a molten state and is applied to the liquid layer forming the intermediate transfer surface in liquid form and solidifies into a solid image on the liquid layer.

23. The method according to claim 17 further comprising the ink used in the imaging step being cooled to a malleable solid condition while on the liquid layer forming the intermediate transfer surface.

24. The method according to claim 23 further comprising the ink used in the imaging step being deformed by pressure while in the malleable solid condition during the transfer to the receiving medium.

25. The method according to claim 24 further comprising the ink used in the imaging step being cooled on the receiving medium to a non-fracturable ductile condition at ambient temperature.

* * * * *